United States Patent [19]

Braun et al.

[11] Patent Number: 4,719,059
[45] Date of Patent: Jan. 12, 1988

[54] PROCESS OF HANDLING AND TRANSFERRING A MOLDED PRODUCT

[75] Inventors: Robert C. Braun, Roselle; Lyle L. Bigelow, Palatine, both of Ill.

[73] Assignee: Duraco Products, Inc., Streamwood, Ill.

[21] Appl. No.: 812,356

[22] Filed: Dec. 23, 1985

[51] Int. Cl.⁴ .................. B29C 45/40; B29C 45/43; B65G 65/02
[52] U.S. Cl. ..................... 264/40.1; 198/468.9; 198/701; 198/710; 198/713; 198/714; 249/66 A; 249/66 C; 264/328.1; 264/328.11; 264/334; 264/335; 264/336; 264/297.2; 414/409; 414/749; 425/436 RM; 425/437; 425/438; 425/444; 425/556; 425/DIG. 102
[58] Field of Search .............. 264/334, 336, 40.1, 264/40.5, 328.1, 328.11, 335, 297.2; 425/436 RM, 139, 437, 438, 444, 556, DIG. 102; 414/403, 404, 405, 409, 749, 750; 198/468.6, 803.14, 468.9, 468.11, 701, 710, 713, 714; 232/43.1, 44; 249/66 A, 66 C

[56] References Cited

U.S. PATENT DOCUMENTS

| | | | |
|---|---|---|---|
| 2,425,362 | 8/1947 | Cherry et al. | 414/749 |
| 3,277,521 | 10/1966 | Strauss | 425/215 |
| 3,756,107 | 9/1973 | Pax et al. | 414/749 |
| 3,936,713 | 2/1976 | Hunkar | 264/40.5 |
| 3,986,811 | 10/1976 | Gunnels | 425/436 RM |
| 4,204,824 | 5/1980 | Paradis | 425/139 |
| 4,363,595 | 12/1982 | Reichenbach et al. | 414/749 |

FOREIGN PATENT DOCUMENTS

| | | | |
|---|---|---|---|
| 2450218 | 7/1975 | Fed. Rep. of Germany | 425/436 RM |
| 0047612 | 3/1982 | Japan | 425/436 RM |

Primary Examiner—Jan H. Silbaugh
Assistant Examiner—Leo B. Tentoni
Attorney, Agent, or Firm—John L. Schmitt

[57] ABSTRACT

A material handling device for transferring a formed good from an injection molding machine includes a pair of spaced tracks. Inner ends of the tracks are positioned below a mold carried by the machine with the track positioned transversely to opening and closing movement of the mold by the machine. On the track is a slidable basket which may be moved from the track inner end to an outer end away from the machine. Basket movement may be effected by activation of a pneumatic drive formed as part of the track and attached to the basket. During forming of a good, the basket is moved under the mold. When forming is complete, the mold opens and the good ejected. The good falls into the basket which has a cushion-like surface to inhibit damage. Opening of the mold starts a first timing period which lapses to activate the pneumatic drive to move the basket and good to the track outer end for good removal. During this first timing period the mold closes to begin a next forming cycle. Lapse of the first timing period also starts a second timing period which lapses after the good is removed from the basket. When the second timing period lapses, the pneumatic drive is reactivated in a reverse direction to return the now empty basket to the track inner end and receive the next formed good.

3 Claims, 4 Drawing Figures

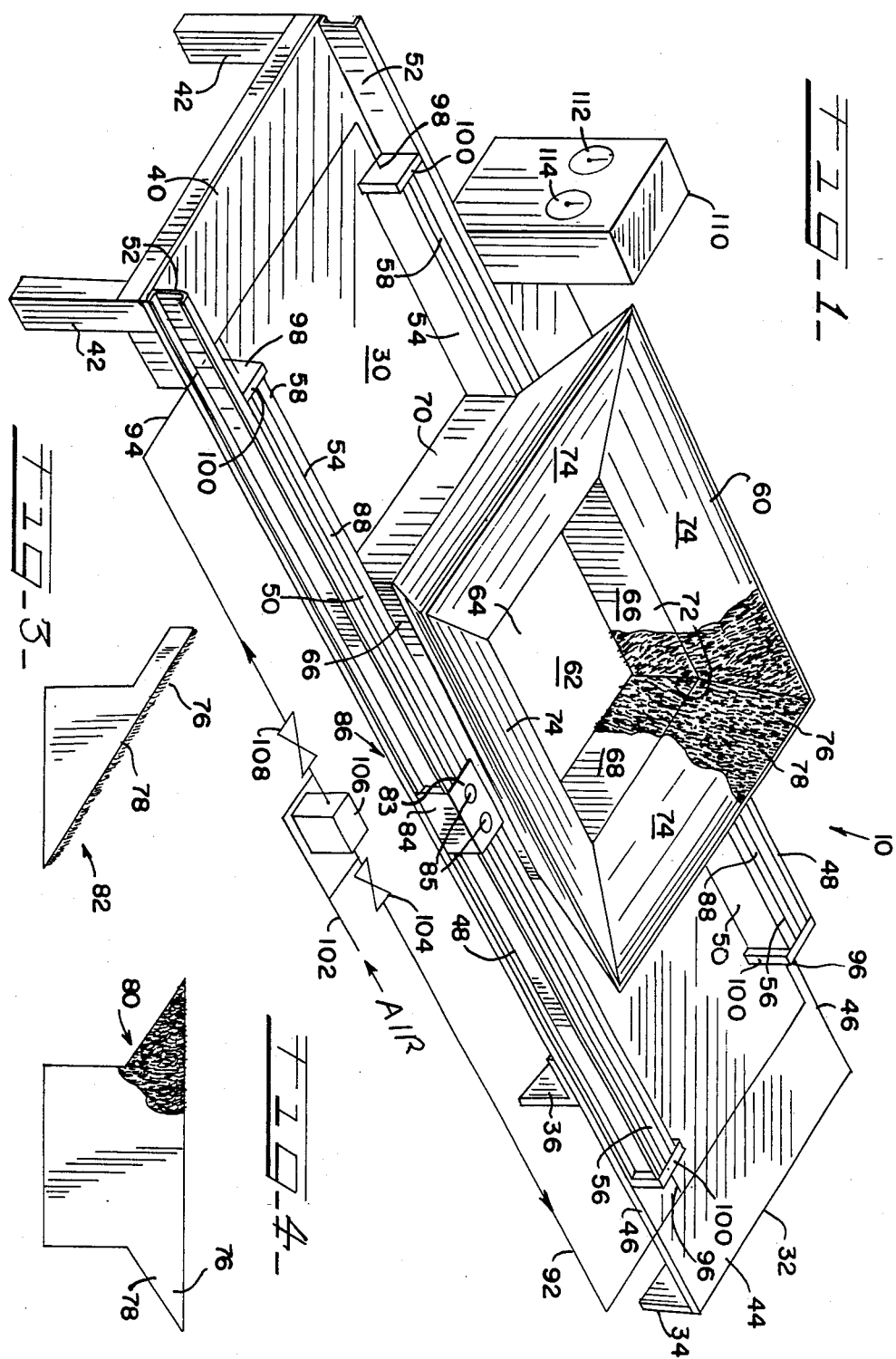

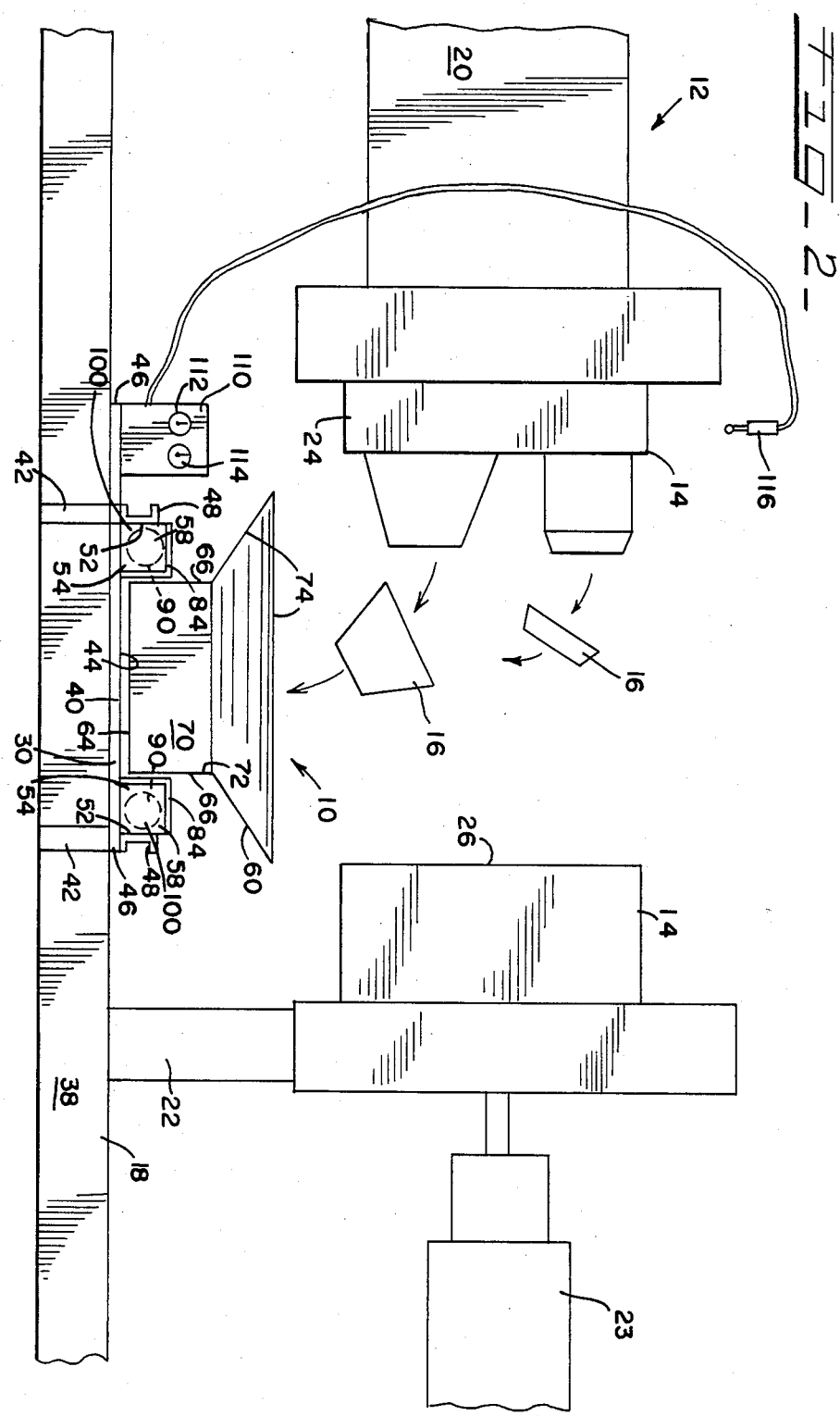

PROCESS OF HANDLING AND TRANSFERRING A MOLDED PRODUCT

BACKGROUND OF THE INVENTION

1. Field of Invention

This invention relates to material handling systems and more particularly to a transfer device for moving a just formed good away from an injection molding machine for further processing

2. Prior Art

When injection molding machines were first put into use to make plastic goods, such goods were manually withdrawn from a mold of the machine after forming. Manual handling immediately proved to be unsatisfactory because the good was still quite hot, requiring an operator to wear heat protective clothing. Additionally, hands of the operator if caught by the mold as it closed would be readily crushed.

To overcome the problems associated with manual good removal, one solution was to place an end of a standard belt-type conveyor under the machine mold. When the mold opened after forming, mechanical means such stripper pins in the mold separated the formed good from the mold so that the good would fall onto the moving conveyor belt below. While an improvement, use of such a conveyor did not prove to be totally satisfactory. Lubricant from the mold also would fall and collect on the conveyor belt. If not removed, a good coming into contact with this lubricant could incur surface damage sufficient to impair surface quality to a degree that the good must be rejected. Good rejection was particularly likely where the good required a high quality surface finish.

Consequently, various other mechanical means have been developed to handle a good just formed in a mold or press. Examples of such means are set forth in U.S. Pat. Nos. 425,362, 3,277,521, 3,756,107 and 4,363,595. The '362 reference discloses apparatus having a pair of stripper fingers which move into an open die to dislodge a just formed part from an upper portion of the die. The dislodged part then falls onto a receiving plate located above a lower portion of the die. Next the receiving plate is withdrawn to a position clear of the die where an ejector plate pushes the part off of the receiving plate.

The assembly of the '521 reference is similar in some respects to the '362 apparatus except that it has an oscillating comb which moves into the open die to separate the culls and runners which connect the various parts during the forming from those parts. The separated parts fall onto a tray which is then withdrawn. During outward movement of the tray an outer end of the tray is guided downward to tip the tray so that the parts on the tray slide into a container. The culls and runners on the comb in turn are removed by a scrapping blade as the comb is withdrawn to fall into a further container.

The collection mechanism of the '107 reference is particularly adapted to use with a press. This mechanism may be selectively tilted so that a receiver may be reciprocated into an open die to receive a part formed therein. The receiver is carried on a slidable mount having a shaft operatively connected to a reciprocating arm which in turn in connected to a rotary drive.

The apparatus of the '595 reference has a movable loading bar assembly defined by a series of spaced apart bars. The bars are formed with longitudinal slots. The assembly may be moved into a molding machine such that parts being held on stations in the machine become positioned in the bar slots. After the stations are lowered, the assembly first moved outward and then inward again. During this further inward movement a cam follower on the assembly engages a stop block causing the assembly to tilt whereby the formed parts slide in a receptacle.

SUMMARY OF THE INVENTION

A material handling device of this invention for shuttling just formed component parts, finished goods and other such articles from a plastic injection molding machine includes a movable basket. This basket has an inner holding space defined in part by spaced sidewalls which connect with an inner and outer end wall. Attached to upper portions of these walls is a respective upward and outward sloped wall portion. A bottom of the basket as well as the walls and sloped wall portions are covered with a readily replaceable cushiony material to provide the basket with a damaging-resistant inner surface. The configuration of the basket holding space may be modified by insertion of a divider panel or deflection panel depending on the size and shape of the good to be carried in the basket.

Connecting with each basket sidewall is a slide block which in turn seats on a guide tube. Each guide tube has a longitudinal slot covered by a metal band. A downward projecting rib on each block depresses the band to seat in a recess in a piston positioned inside each tube.

The guide tubes define a pair of tracks for sliding movement of the basket between an inner end located under a mold carried by the machine and an outer end positioned remotely from the machine. The track is positioned transversely to opening and closing movement of portions of the mold by the machine.

Basket movement is effected by connecting ends of the guide tubes to a supply of pressurized air through a solenoid operated two-way air valve. This valve is activated by two timing devices in a controller operatively connected to the machine and an electric power source.

During operation the basket is moved under the mold just before forming of the good is complete. Once forming is complete, the machine draws the mold portions apart whereupon the formed good is ejected from the mold. The good falls in a relatively controlled manner into the basket below. Opening of the mold also activates the first timer to start a first timing period. When this first timing period lapses, the air valve is energized to connect inner ends of the guide tubes with the air supply and drive the pistons, basket and included good to the outer end of the track. An operator at the outer end then may remove the good from the basket for further processing as may be required. During good removal the machine closes the mold to begin forming of a further good.

Lapse of the first timing period also activates the second timer to start a second timing period. This second period lapses after the good is removed from the basket to reactivate the air valve and connect the guide tube outer ends with the air supply. The pistons and now empty basket are returned to the track inner end beneath the mold during a final portion of the good forming cycle.

The material handling device of this invention provides several important advantages over other like known devices.

A first advantage is that operation of this device is substantially independent of the operation of the molding machine. Thus, the rate at which the machine may produce goods is not reduced by operation of the device. Note that where a robotic device having an arm with a mechanism to grasp or otherwise receive the good is used to remove the good from the mold, that arm cannot be activated until the mold is open. Additionally, the mold cannot be closed until the arm and good have cleared the mold. As a consequence, the rate of good production is slowed by use of a mechanical device which must first enter the machine and then leave the machine with the good. Because the device of this invention does not enter the machine, it does not impede the rate at which goods may be produced.

A second advantage is that the effective rate of good production is increased in that very few goods need be rejected due to damage occurring during the material handling step. It should be appreciated that as a good is ejected from the mold it is still quite hot and where made of thermoplastic also quite soft. Also, many plastic goods require a high quality finish to be commercially acceptable. By controlling the fall of the good into the basket holding space which has a cushiony, damaging-resistant surface, damage to the good is inhibited. Where the good does not fall in the desired manner, the basket upper wall portions merely deflect the good into the basket holding space.

Good rejection rate is still further reduced by being able to readily remove and replace the cushiony material on the basket. Note that operation of the machine and mold requires lubrication which inadvertently drips from the mold. This lubricant may combine with ambient particles of dirt to soil the cushiony material on the basket where it comes in contact with the basket. A white colored surface of a good may be impaired by contact with a soiled area in the material, for example. To increase the useful life of the material, the time during which the basket is held below the mold is kept to a minimum. To facilitate maintenance, the basket is readily removable and the cushiony material readily removable and replaceable. Thus, a basket with dirty material may be easily replaced by a basket with clean material. Being able to remove the basket from the device also provides easy access to the machine when maintenance to the machine is required.

A still further advantage of this material handling device is that it promotes operator safety and operator efficiency. Note that the operator does not have to reach into the machine to handle the good but is at a safe distance from the molding machine during handling. Further, the basket holding space reliably locates the good. As noted above, an insert may be required to promote proper good location in the basket. By locating the good for operator handling in the same place each time a good is formed, the operator may be maintained in an optimum position to perform a further manufacturing step, for example placing the good in a protective bag in preparation for storage or shipping.

DESCRIPTION OF THE DRAWINGS

FIG. 1 is a perspective view of the material handling device of this invention.

FIG. 2 is an end elevation view of the device of FIG. 1 as would be seen when the device interacts with an injection molding machine.

FIG. 3 rs a side elevation view of a deflection panel which also may be used in the basket holding space.

FIG. 4 is a side elevation view of a divider panel which may be placed in a holding space of a basket of the material handling device to divide the holding space.

DESCRIPTION OF THE PREFERRED EMBODIMENT

A material handling device particularly adapted for transferring a plastic component part, finished good or other like article between locations is shown generally in FIG. 1 and designated 10. As seen in FIG. 2, the device 10 has been attached to an injection molding machine 12 carrying a mold 14. This mold 14 may have from one or more cavities to form a like number of goods at the same time. As shown, the mold 14 has two cavities to form two such goods 16. In this case the goods 16 are a decorative pot and supporting plate for an indoor plant. Such plants presently are quite popular and in wide use in homes and offices.

The machine 12 is conventional in nature having a base 18 carrying a movable ram 20 and a stationary support 22 to which a plastic injection unit 23 is connected. The mold 14 comprises a male portion 24 carried by the ram 20 and a female portion 26 also attached to the support 22. As shown in FIG. 2, the mold portions 24,26 have been drawn apart to open the mold 14 with the goods 16 being ejected from the mold 14.

The material handling device 10 includes a platform 30. Attached to an inner end 32 of the platform 30 is an end bar 34 and an intermediate guide angle 36. The bar 34 and angle 36 are spaced apart to fit closely on each side 38 of the machine base 18 with the platform 30 resting on the machine base 18 and positioned transversely thereto. An outer end 40 of the device platform 30 is supported by a pair of legs 42.

Attached to a top side 44 of the platform 30 along each side edge 46 of such is a channel 48. The channels 48 extend from the platform outer end 40 to a point proximately midway between the end bar 34 and intermediate angle 36. A guide tube 50 is attached to an inner side 52 of each channel 48. The tubes 50 comprises a track 54 having an inner end 56 and outer end 58 for movement of a basket 60 therebetween.

The basket 60 has an inner holding space 62 defined by a bottom 64, sidewalls 66 and a connecting inner and outer end walls 68,70. Joined to a top portion 72 of each basket walls 66–70 is an outward and upward sloped peripheral wall portion 74. The basket bottom, walls and sloped wall portions 64–70 and 74 are covered with a cushiony material 76 such as a carpet (only shown in part) to form a damaging resistant surface 78. The basket holding space 62 may be divided into smaller compartments by a divider panel 80, see FIG. 4, also covered with the material 76 to have a similar damaging resistant surface 78. Additionally, a deflection panel 82 having a like surface 78, see FIG. 3, may be placed in the basket inner space 62 or the compartments formed by the divider panel 80.

A mounting bracket 83 is attached to each basket sidewall 66 which in turn is secured to a slide blocks 84 by a set of pins 85 allowing the basket 60 to be readily removed from the device 10 for replacement of the material 76 or maintenance to the machine 12. The blocks 84 are operatively carried on the guide tubes 50. The slide blocks 84 and guide tubes 50 form part of a pneumatic drive 86 commercially available from Origa Corporation of Elmhurst, Illinois. The drive 86 is not shown in detail but is briefly described to aid in understanding this invention. Each tube 50 is formed with an upper longitudinal slot (not shown) covered by a band 88. Each block 84 has a downward projecting rib (not shown) which under the load of the basket 60 depress the respective band 88 to seat in a recess (not shown) in a piston 90 positioned inside each tube 50.

To effect movement of the pistons 90 and operatively attached basket 60 between the inner and outer end 32,40 of the platform 30, two air lines 92,94 connect respectively with inner and outer inlets 96,98 in end plates 100 attached to ends of the tubes 50. The inner end air line 92 joins tube inlets 96 to an air supply line 102 through one side 104 of a solenoid operated two-way air valve 106. An opposite side 108 of the air valve 106 connects the air supply line 102 with tube outer inlets 98 through the air line 94. The air valve 106 in turn is operatively connected to a controller 110 which includes a first timer 112 and a second timer 114. The first timer 112 is operatively connected to a limit switch device 116 mounted on the machine 12 so as to be activated by movement of the male mold portion 24 when the mold 14 opens.

During production of the goods 16 the injection molding machine 12 is operated in a conventional manner with plastic resin being forced under high pressure and a high temperature into the mold 14 when closed by the injection unit 23. The time to form one set of goods 16 may be as long as 30 seconds depending on the size of the goods 16. When forming is complete, the mold 14 opens with the male mold portion 24 being drawn away from the female portion 26 by the machine ram 20. The goods 16 are ejected from the mold male portion 24 by air and movement of a stripper ring or pins forming part of the mold 14. The force applied to eject the goods 16 is closely regulated to produce a controlled fall where the goods 16 follow a path of movement to come to rest in an undamaged condition in the basket holding space 62. On those few occasions where the fall of the goods 16 deviates from the desired path, the goods 16 first contact the basket sloped wall portions 74 and then are guided by such into the basket inner holding space 62.

Note that when the mold 14 has two cavities positioned in a side-by-side relationship, the divider panel 80 may be placed in the basket 60 to prevent contact between the goods 16 as they come to rest in the basket inner holding space 62. Additionally, when it is desirable to have the goods 16 come to rest in close proximity to one particular basket sidewall 66, the deflection panel 82 may be placed in the basket 60. The deflection panel 82 may be sized for use with or without the divider panel 80.

When the mold 14 opens, this movement is sensed by the limit switch 116 to close a circuit and energize the first timer 112 and start a first timing period. After several seconds the first timing period lapses to close a further circuit and energize the air valve 106 to open the inner valve side 104 and connect the guide tube inner end inlets 96 with air in the air supply line 102. The flow of air drives the pistons 90, the basket 60 and goods 16 to the platform outer end 40. Lapse of the first timing period also closes another circuit to energize the second timer 114 and start a second timing period.

The second timing period lapses after approximately 20 seconds. The second timing period is sufficiently long for the basket 60 to travel to the platform outer end 40 where an operator may remove the goods 16 for a next manufacturing step as may be required. Because the goods 16 are consistently located by the basket 60, the operator may maintain an optimum position to perform this next step in a safe and efficient manner. At all times the operator is at a safe distance from the machine 12.

When the second timing period lapses, a still further circuit is closed to again energize the valve 106 to open the valve outer side 108 and connect the air supply line 102 with the guide tube outer end inlets 94. The pistons 90 and now empty basket 60 are returned to platform inner end 32 under the machine mold 14. The lapse of the second timing period is regulated so that the basket 60 is only under the mold 14 for the several seconds before the mold 14 opens to eject a further set of just formed goods 16. Minimizing the time that the basket 60 is beneath the mold 14 minimizes the opportunity for lubricant on the mold 14 to drip on the cushiony material 76 and form a soiled area. Were the goods 16 to come into contact with such an area, a surface of the goods 16 could be damaged to the extent that the goods 16 must be rejected.

While an embodiment of this invention has been shown and described, it should be understood that this invention is not limited thereto except by the scope of the claims. Various modifications and changes can be made without departing from the scope and spirit of the invention as the same will be understood by the skilled in the art.

What we claim is:

1. A method of making articles in an injection molding machine and transferring said articles from said machine, said method comprising the steps of:

moving horizontally apart a female and a male portion of a mold carried by said machine to open said mold, ejecting from said opened mold a just formed, still hot article immediately after said mold opening, closing said mold immediately after said ejection to begin making a further article in said mold, dropping said ejected article from said opened mold into a basket positioned below said mold, catching in a damage resistant manner said dropped article by interacting said article with a clean, cushiony surface of said basket and thereby causing said article to come to rest in said basket.

energizing operative means to move said basket with said article to a point remote of said machine immediately upon said article coming to rest therein, removing said article from said basket to empty said basket, holding said basket at said remote location as said further article is being formed, and energizing said operative means to return empty basket to said position below said mold immediately before formation of said further article is complete and in time to catch said further article upon said further article being ejected from said mold.

2. A continuous, high production method of forming a plastic article in a machine wherein said article is formed in a mold carried by said machine and transferring said article from said machine, said method comprising the steps of:

sensing horizontal movement of portions of said mold from a closed condition to an open condition, transmitting said sensed movement to a controller having a first timing device to energize said timing device and start a first timing period, ejecting said article from said open mold to allow said article to fall downward in a controlled manner into an empty basket positioned below said mold, cushioning said fall of said article by interacting said article with a clean, cushiony surface of said basket and thereby causing said article to come to rest in said basket to inhibit damage to said article, energizing operative means connected to said first timing means and to said basket to move said basket with said article to a point away from said machine upon lapse of said first timing period immediately after said article comes to rest in said basket, closing said mold to start a further article forming cycle immediately following said ejection, energizing a second timing device carried by said controller and operatively connected to said first timing device and to said operative means to start a second timing period upon lapse of said first timing period, removing said article from said basket at said away point to empty said basket, holding said basket at said point away from said machine as said further article is being formed, and energizing said operative means in a opposite direction to return said empty basket to said position below said mold upon lapse of said second timing period immediately before completion of said further forming cycle and in time to catch said further article upon said further article being ejected from said mold, wherein said method allows operation of said machine at a maximum rate and transfer of articles formed in said machine in a damage resistant manner.

3. A method as defined by claim 2 and further characterized by, said article being a flower pot with said mold portions moving apart being movement of said male portion away from a stationary position of said female portion, and said ejection of said article being from said male mold portion.

* * * * *